(12) United States Patent
Sweeney

(10) Patent No.: US 7,197,324 B2
(45) Date of Patent: Mar. 27, 2007

(54) PERMISSION BASED TEXT MESSAGING

(76) Inventor: Robert J. Sweeney, 6825 NW. Monticello Ct., Parkville, MO (US) 64152

( * ) Notice: Subject to any disclaimer, the term of this patent is extended or adjusted under 35 U.S.C. 154(b) by 136 days.

(21) Appl. No.: 11/047,155

(22) Filed: Jan. 31, 2005

(65) Prior Publication Data

US 2006/0172749 A1    Aug. 3, 2006

(51) Int. Cl.
*H04Q 7/20*    (2006.01)
*H04L 29/06*    (2006.01)
*H04M 3/00*    (2006.01)

(52) U.S. Cl. .................. 455/466; 455/414.3; 455/419
(58) Field of Classification Search .............. 455/466, 455/414.3, 419
See application file for complete search history.

(56) References Cited

U.S. PATENT DOCUMENTS

| | | | |
|---|---|---|---|
| 6,741,856 B2 * | 5/2004 | McKenna et al. | 455/422.1 |
| 2002/0037716 A1 * | 3/2002 | McKenna et al. | 455/422 |
| 2002/0107002 A1 * | 8/2002 | Duncan et al. | 455/412 |
| 2003/0100337 A1 * | 5/2003 | Chotkowski et al. | 455/556 |
| 2004/0180683 A1 | 9/2004 | Dennis et al. | |
| 2004/0224693 A1 * | 11/2004 | O'Neil et al. | 455/445 |
| 2004/0247090 A1 | 12/2004 | Nurmela | |
| 2005/0050144 A1 * | 3/2005 | Borin | 709/206 |
| 2005/0288044 A1 * | 12/2005 | Atkins et al. | 455/466 |
| 2006/0003694 A1 * | 1/2006 | Quelle | 455/3.06 |
| 2006/0004632 A1 * | 1/2006 | Kelsen et al. | 705/14 |

* cited by examiner

*Primary Examiner*—Nick Corsaro
*Assistant Examiner*—Christopher M. Brandt
(74) *Attorney, Agent, or Firm*—Mark Manley

(57) ABSTRACT

A system and method for narrowcasting text messages to a plurality of cellular phones. The system and method allow a potential user to opt in to receive the text messages the user wants to receive. The potential user can opt in through a computer network based web page. Once the potential user sends a sign up request application to participate via the computer network, the user will receive a first text message containing an authorization code on their cell phone. The user enters the authorization code into the web page and sends the authorization code. Receipt of the authorization code back through the computer network will trigger the phone number of the potential user to be added to a list of authorized text message receivers. A narrowcaster then instructs the central computer to narrowcast text messages to the phone numbers on the list that have indicated they want to receive messages on a certain topic.

17 Claims, 6 Drawing Sheets

Figure 2

WELCOME TO THE CMSU SPORTS CONNECTION

GET WIRELESS UPDATES ON ALL CMSU SPORTS SENT TO YOUR MOBILE PHONE — 200

Get even better connected with CMSU Sports. With CMSU Sports Connection, stay up-to-date with your favorite Mules & Jennies sports. Choose the information you want and have scores & updates sent to your mobile phone as a text message.

SIGN-UP TODAY - IT'S FREE

CMSU SPORTS CONNECTION TEXT MESSAGE CATEGORIES INCLUDE:

CMSU All-Sports Update - Select this category and get sports scores and updates for all the CMSU sports teams. Just check this one box during sign-up and you'll be updated on all CMSU sports!
Cross Country - Stay updated with updates and results from the CMSU Cross Country team. — 121
Jennies Basketball - Get scores and updates for Jennies Basketball.
Jennies Bowling - Get results & updates about the Jennies Bowling team.
Jennies Soccer - Get scores and updates on Jennies Soccer.
Jennies Softball - Get scores and updates on the Jennies Softball team.
Jennies Volleyball - Get results and updates about the Jennies Volleyball team.
Mules Baseball - Get scores and updates on Mules Baseball.
Mules Basketball - Get scores and updates on Mules Basketball.
Mules Football - Get scores and updates on Mules Football.
Mules Golf - Get results for Mules Golf.
Mules Wrestling - Get results for Mules Wrestling.
Track & Field - Get results and updates on CMSU Track & Field.

SIGN-UP TODAY FOR CMSU SPORTS CONNECTION - IT'S FREE!

STEP 1: SIGN-UP - TEST YOUR PHONE

The first step in subscribing is making sure your mobile phone can receive text messages. Please complete the information below, and we will send a personal authorization code via text message to your mobile phone. Enter this code during the next step to continue. If you would like to receive email messages, please enter your email address.

Name: [ ] 131
   * Required
Timezone: [(GMT-05:00) Eastern Time (US & Canada) ▼] 132
Mobile Number: [ ] 133
   * Required
Carrier: [Select Wireless Carrier ▼] 134
Email: [ ] 135
   (Optional)
Zip Code: [ ] 136
   * must be 5 digits
   send authorization code 139 [unsubscribe]    [submit] 138

Figure 3

An Authorization Code has been sent as a text message to your mobile phone. This part of the sign-up process fights SPAM and the unauthorized sending of text messages to people without their knowledge. When you receive your Authorization Code, please enter it into the box below. Then, choose the message group(s) you wish to receive. Finally, click on the SUBSCRIBE NOW button and you're finished.

— 300

STEP 2: ENTER YOUR AUTHORIZATION CODE

Please enter the authorization code that was sent to your mobile phone.

Authorization Code: [    ]  225

[ subscribe ]  — 320

PERMISSION BASED TEXT MESSAGING

RELATED APPLICATIONS

None

BACKGROUND OF THE INVENTION

In the communications industry it is often desirable to be able to narrowcast a message that will be received instantly by a large number of people such as potential customers or people who may need to be aware of an emergency situation. Care must be taken not to offend the potential customer or others with unwanted messages such as unsolicited product offerings.

Patent application 2004/0247090 discloses an alert system capable of formatting a message and sending that alert message out over a variety of platforms including text messaging to cell phones. This system uses a database of potential recipients of the message. The problem with the system is that the recipients may not want to receive the message. Even if they are potentially interested in the message, they may be confused as to why they have received the message and may delete the message because they don't know what the message is or why they are receiving it. The public at large has grown wary of unsolicited offers coming by traditional mail, phone, text message and by email. Selling of customer lists and unwanted offers and information can lead to a backlash such as the recent 'no-call' lists in the telemarketing industry. The so called "can-spam" law was put in place to protect consumers against unwanted text messages for example.

Patent application 2004/018683 discloses a system of communicating so called "Amber" alerts to a mobile work force. This system narrowcasts an alert to a closed community of company workers. While those workers may be more receptive to receiving the messages narrowcast, this system still does not suggest a solution to reaching an audience in the general public that is receptive to the information being sent.

As can be seen there is a need for a narrowcast communications system that will allow information to reach the public quickly and efficiently but that information must be wanted by the recipients such that there is no resentment towards the sender.

SUMMARY OF THE INVENTION

The present invention relates to a narrowcast communications system that allows a message to be narrowcast to a receptive audience in the general public that is prepared to receive that message. However, this application is targeted at a method and system that can be called "Narrowcasting". Unlike broadcasting, narrowcasting sends a message to a target audience of potential receivers that have given permission to have the message sent to their cell phone. The present invention further provides for a narrowcast communication system wherein a person can opt in to receive text messages narrowcast from a central location. The person can opt in, for example, by going to a participating web page and clicking on an icon to bring up an application to sign up for text messages. The application may include a variety of potential topics that the potential user may select. The user then can input into the application a cellular phone number and an email address and also select the message category they wish to receive.

The present invention further includes a method for narrowcasting text messages to plurality of cellular phones including the steps of receiving, over a computer network, a request to receive text messages. After the sign up request is received, an authorization code is sent to a cellular phone number received in said request and verifying the authorization code has been received. Then adding the authorized cellular phone number to a list of authorized phone numbers, and placing a text message call to at least a portion of the list of authorized phone numbers.

These and other advantages of the present invention will become apparent from the detailed description of the invention.

BRIEF DESCRIPTION OF THE DRAWINGS

FIG. 2 shows a screen shot of a portion of the system of the present invention;

FIG. 3 shows a screen shot of a portion of the system of the present invention;

DETAILED DESCRIPTION OF THE DEVICE

Sending text messages to cellular phones has become a common way to communicate. It is possible to narrowcast a single message to a plurality of cellular phone users. This application is targeted at a method and system that can be called "Narrowcasting". Unlike broadcasting, narrowcasting sends a message to a target audience of potential receivers that have given permission to have the message sent to their cell phone and/or email. For the purposes of this application 'narrowcasting' means sending a text message and/or email to receivers who have given permission.

Figure 1:
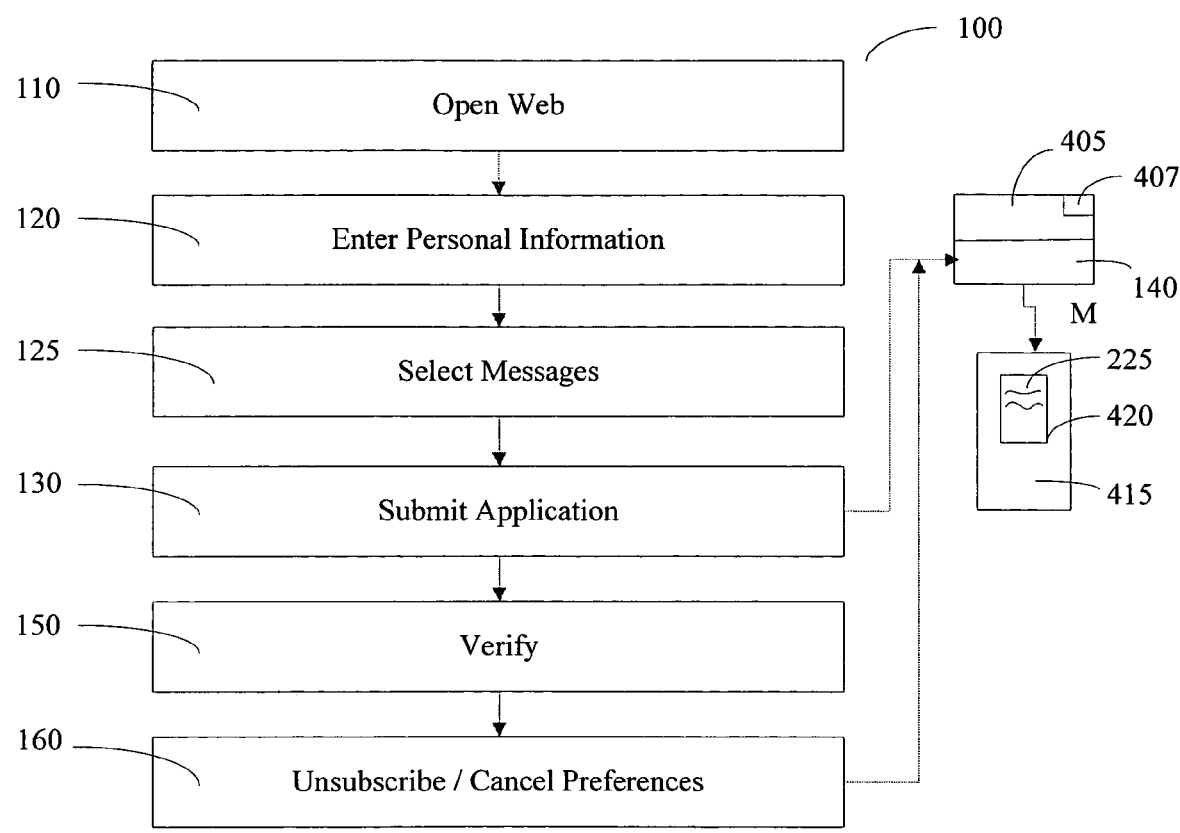
FIG. 1 shows a flow diagram of a portion of the present invention.

FIGS. 1 and 2 show a flow chart of the permission process 100 of how a customer who would typically be remote from a central computer 405, can take the option and give permission to receive text messages from the central computer 405. The potential system user can open 110 the web page, see FIG. 2 for a computer screen shot of the web page based application 200. The potential user can then enter 120 personal contact information and select 125 message topics from a field of possible message topics (121 in FIG. 2). FIG. 2 shows a screen shot of application 200 of the application process as applied to a University sports organization where a potential user can select from a field of possible message topics 121 of sports events as an example. Once the potential user has entered 120 the message topics 121 they want and submitted 130 the application 200, the application 200 can be submitted over a network N to a central computer 405 that includes a database 407 to store information such as a list of authorized cell phone numbers. The central computer 405 will, after a moment delay, send 140 the potential user a message M containing an authorization code 225 to their cell phone 415 for display on cell phone screen 420. Sending 140 the authorization code 225 contained in text message M serves two purposes, it demonstrates the technology to the potential user so that they can see immediately that the system is working to ensure the user's phone is text enabled. It also provides a loop for the user to verify 150 their desire to opt in to the system by entering the authorization code 225 they receive in the text message M back into the opt-in web page, see screen shot FIG. 3. This can prevent unauthorized permission, for example where an unauthorized person might attempt to enroll a person who has not given permission. The unauthorized person would not only need to know the cell phone number but would also need to be in possession of the phone 415 to return the authorization code 225. FIG. 1 also shows that the permission process 100 can include an option for the person to unsubscribe 160 or change message preference. Thus a user can return to the permission process 100 at a later time and unsubscribe 160 from receiving the narrowcast messages M or change message topics 121. FIG. 2 shows that a user can unsubscribe by clicking button 139.

Figure 4:
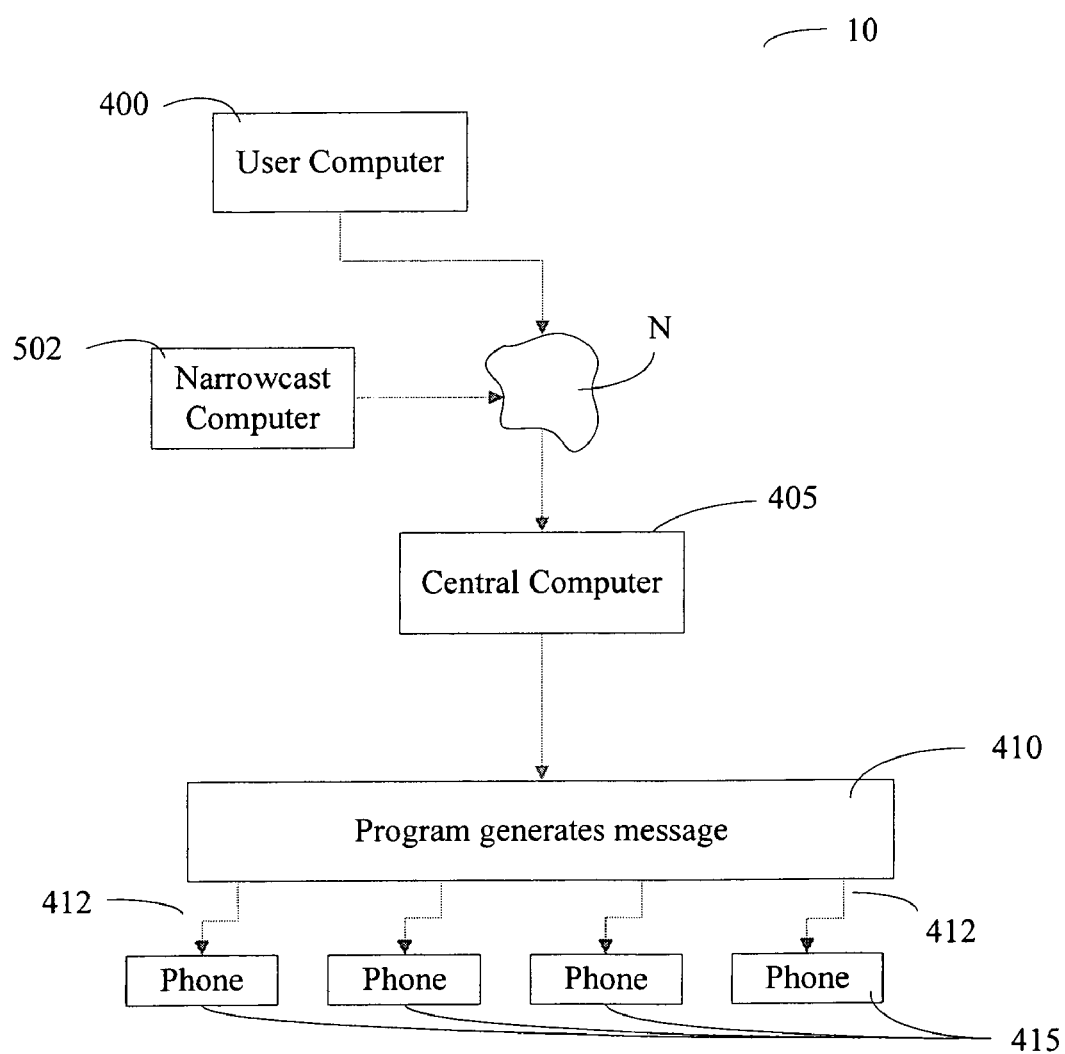
FIG. 4 shows a second flow diagram of a portion of the present invention.

FIG. 2 shows a screen shot of application 200 of the user intake web page as it might be displayed on a user computer 400 (see FIG. 4). The application 200 covers the steps 110, 120, 125 and 130 in FIG. 1. The user can select 125 from a field of topic choices 121. In this case the choices 121 are college athletic teams but could be any topic choice. The application 200 then prompts for personal information such as name 131, timezone 132, mobile or cellular number 133, Carrier 134, email 135 and zip code 136. Once this information 121 and 131–136 is entered the user actually submits the information 121 and 131–136 using a submit button 138. Once submitted via network N such as the Internet, the information 121 and 131–136 will arrive at a central computer (405 FIG. 4). The central computer 405 can then send message M containing an authorization code 225 to the cell phone 415 of the potential user. Once submitted the user computer 400 screen will change from application 200 to authorization 300 to that shown in FIG. 3. Later a person returning to the application 200 can unsubscribe 139 to stop receiving messages from some or all of the topics 121 initially chosen. A user can also return to application 200 later and add additional topics 121 or delete unwanted ones.

FIG. 3 shows a screen shot of the authorization web page 300. The user will be prompted to enter the authorization code 225 that they receive on their cell phone 415 from the central computer 405. The user can then complete the authorization process by clicking the subscribe 320 button. The authorization is then sent from the user's computer (400 FIG. 4) to the central computer 405 via the Internet.

FIG. 4 shows a view of the system 10 which can include a user computer 400 that allows the user to opt into the system 10 through a network N such as the Internet. A central computer 405 which contains the opt in application forms shown in FIGS. 2 and 3. The central computer 405 can include a program 410 to generate and narrowcast text messages 412 to user phones 415 of people who have opted in to receive messages 412. The system can also include a narrowcaster computer 502 where a third party narrowcaster can generate messages to be sent to authorized users and the messages can be forwarded to the central computer 405 to be transmitted. For example, a university may be a third party that wishes to narrowcast messages such as university team scores for sporting events to willing alumni. In this example, the university narrowcaster computer 502 would create a message that would be forwarded through the internet N to the central computer 405 to be transmitted to the cellular phones 415 of alumni who have expressed a willingness to receive the score messages.

Figure 5:
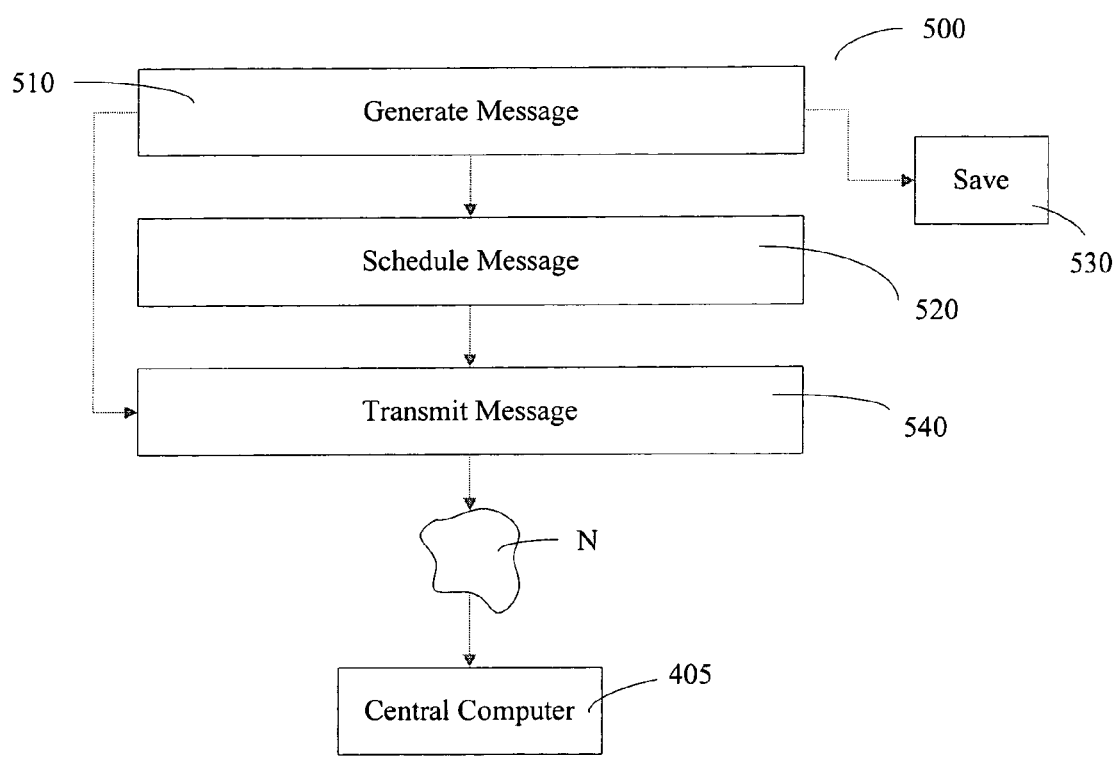
FIG. 5 shows a third flow diagram of a portion of the present invention.

FIG. 5 shows the narrowcast text messages process 500, a narrowcaster might use to narrowcast text messages 412 to a number of users who have given permission to receive the text message 412. The narrowcaster first generates 510 a message 412 to be narrowcast. The generation step 510 can include inputting characters into a text message box 602 (see FIG. 6). The message 412 can be sent immediately or scheduled 520 for narrowcast at a specific time and date. The message can be scheduled 520 for recurring transmission such as daily or monthly. The narrowcaster can save 530 the message 412 for future use and transmit 540 the message. Many narrowcasters will not actually have a computer system to transmit multiple text messages or email. Rather the transmit 540 step will involve sending the message 412 over a computer network N to the central computer 405 where the phone numbers of the phones 415 authorized to receive the message 412 can be stored.

Figure 6:
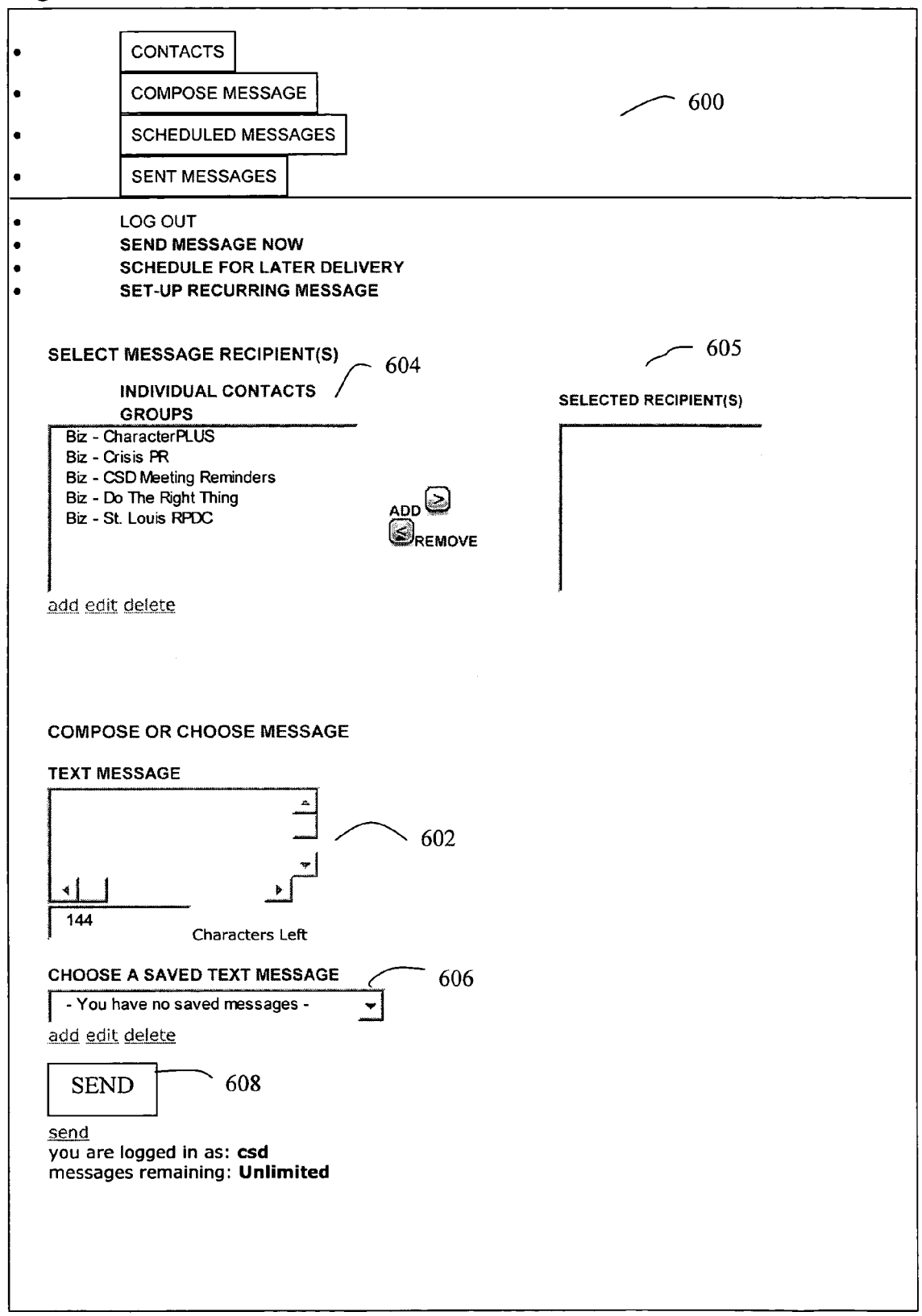
FIG. 6 shows a screen shot of the process for message creation and narrowcasting.

FIG. 6 shows a screen shot 600 containing some of the details of the narrowcast text messages process 500. The screen 600 can include a text box 602 to compose a message 412 to be sent. The narrowcaster can select message recipients 605 that can include authorized individuals or groups of individuals who might receive a message 412. The narrowcaster can also select the option of saving 606 a message 412 and can choose to send 608 a message 412 from screen 600. When the narrowcaster selects send 608, the narrowcaster's computer will contact the central computer 405 through the network N and the central computer 405 will send the generated text message 412 to the recipients 605 selected from a list of all authorized recipients 604. The text message 412 will be sent essentially simultaneously to all cellular phones 415 on the list 605 of recipients.

In use, a potential user learns of the possibility of receiving one or more text messages 412 on a topic they are interested in such as scores of a sports team at their school. The potential user can be directed to a web page where the user can complete an on-line application 200 and submit the on-line application 200 via the network N such as the Internet. A central computer 405 receives the on line application 200 and can send an authorization code 225 in a text message M to the cell phone number indicted in the online application 200. The potential user must then authorize the online application 200 by sending the authorization code 225 back over the Internet N to the central computer 405. Authorization can occur through a separate authorization web page 300. Although the preferred process shows a web site, it would be possible for the potential user to send a request via email, to receive the authentication code back on their cell phone and then to send a second email to verify the authorization code 225. Either method verifies that the person asking for permission actually possesses the cell phone being authorized to receive messages 412.

While the invention has been described in reference to a preferred embodiment, it is not necessarily limited to the particulars set forth. On the contrary, it is intended to cover such alternatives, modifications and equivalents as set forth in the spirit and scope of the invention as defined by the appended claims.

The invention claimed is:

1. A method for permission based sending of text messages to a plurality of cellular phones including the steps of;
   receiving, over a computer network, a request to sign up to receive text messages,
   generating an authorization code in response to receiving said request,
   sending said authorization code as a first text message to a cellular phone number received in said request,
   receiving said authorization code, entered by a user of said cellular phone, back over said computer network to verify said authorization code has been received by said cellular phone, adding said cellular phone number to a list of authorized cellular phone numbers, and narrowcasting, with permission, a second text message to a plurality of authorized cellular phone numbers.

2. The method of sending text messages of claim 1, wherein the step of receiving, includes a step of posting a website containing an application to sign up for text messages.

3. The method of sending text messages of claim 2, wherein the application includes a plurality of possible message topics that can be selected.

4. The method of sending text messages of claim 1, wherein the step of sending said authorization code as a first text message occurs immediately after receiving said application.

5. The method of sending text messages of claim 1, wherein the step of transmitting a second text message includes generating and saving said message.

6. The method of sending text messages of claim 5, wherein the step of transmitting said second text message includes the step of scheduling a time for said message to be sent to said plurality of authorized cellular phone numbers.

7. A system for narrowcasting text messages to a plurality of cellular phones including;
a central computer to receive a request to sign up for text messages,
said central computer including a connection to a network,
a remote second computer, connected to the network, that receives an application to sign up for text messages,
a remote cellular phone adapted to receive a text message containing an authorization code from said central computer,
said application adapted to verify said authorization code has been received by allowing a user of said phone to enter said verification code from said cell phone into said application, and returning said application via computer network thereby authenticating said user to receive text messages,
said central computer confirming acceptance of said application in response to receiving said code in said application,
a database in said central computer containing a plurality of authorized phone numbers received from said application,
and a means of transmitting a text message to a list of a plurality of authorized phone numbers stored in said database.

8. The system of claim 7 wherein said text messages are generated on a third computer connected to said network and sent to said central computer for narrowcast to said list of authorized phone numbers.

9. A method for narrowcasting text messages to a plurality of cellular phones including the steps of;
receiving from a first computer, over a computer network, an application to sign up for text messages,
creating an authorization code in a second computer,
sending the authorization code to a cellular phone number received in said application, to be displayed on a screen of said cellular phone,
verifying said authorization code has been received, by allowing a user of said phone to enter said authorization code from said cell phone into said application, and returning said application containing said authorization code via computer network,
transmitting multiple text messages to said cellular phone number without further authorization.

10. The method of claim 9 wherein said step of transmitting a text message includes the step of generating a text message at a third computer and forwarding the text message to said second computer.

11. The method of claim 10 wherein the step of verifying includes said second computer receiving a copy of said authorization code from said first computer.

12. The method of claim 11 wherein the step of receiving includes the step of making said application available over a computer network.

13. The method of claim 12 wherein the application includes a list of possible message topics.

14. The method of claim 13 wherein the step of transmitting a text message includes the steps of saving said text message and the step of scheduling said text message for narrowcast.

15. The method of claim 14 wherein the step of verifying said authorization code has been received, is followed by a step of saving a cell phone number from said application in an authorized phone number list.

16. A method of signing a user up to receive a text messages including the steps of;
receiving an application over a computer network from a user computer, said application including a cell phone number and information on a carrier of said cell phone,
generating an authorization code in a central computer,
sending said authorization code to a cell phone to be display on a screen of said cell phone,
sending an authorization web page to be displayed on said user computer,
receiving said authorization web page back over said computer network from said user,
comparing a code received in the authorization page with said authorization code,
authorizing said cellular phone number to receive permission based text messages if said code received in said authorization page matches said first code,
entering said cellular phone number into a database of a plurality of authorized phone numbers.

17. The method of claim 16 wherein once authorized, said cellular phone will receive a plurality of text messages without the need for additional authorization, and wherein said cellular phone number will continue to receive text messages until said user returns to said authorization page and requests to unsubscribe.

* * * * *